Patented Mar. 30, 1926.

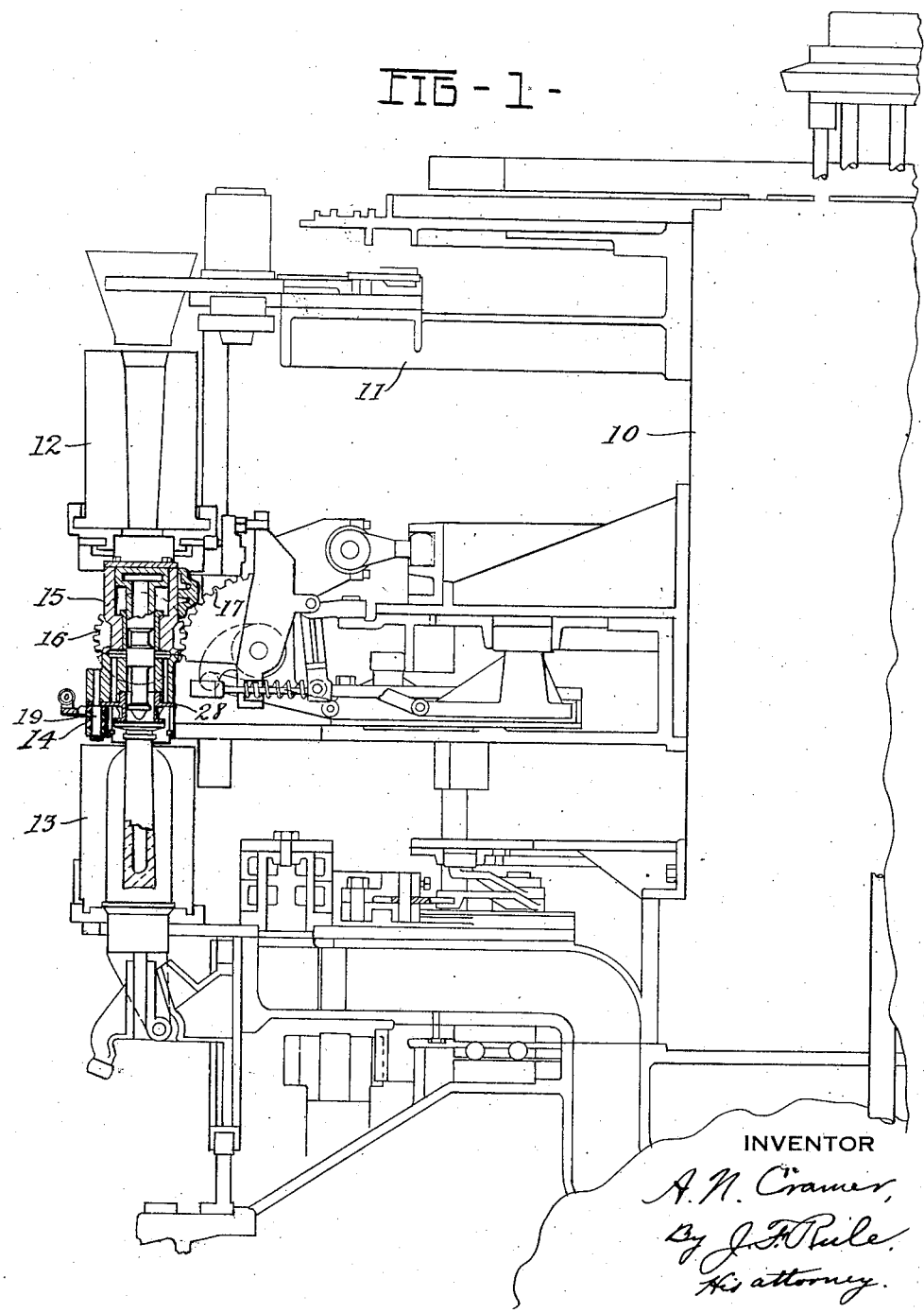

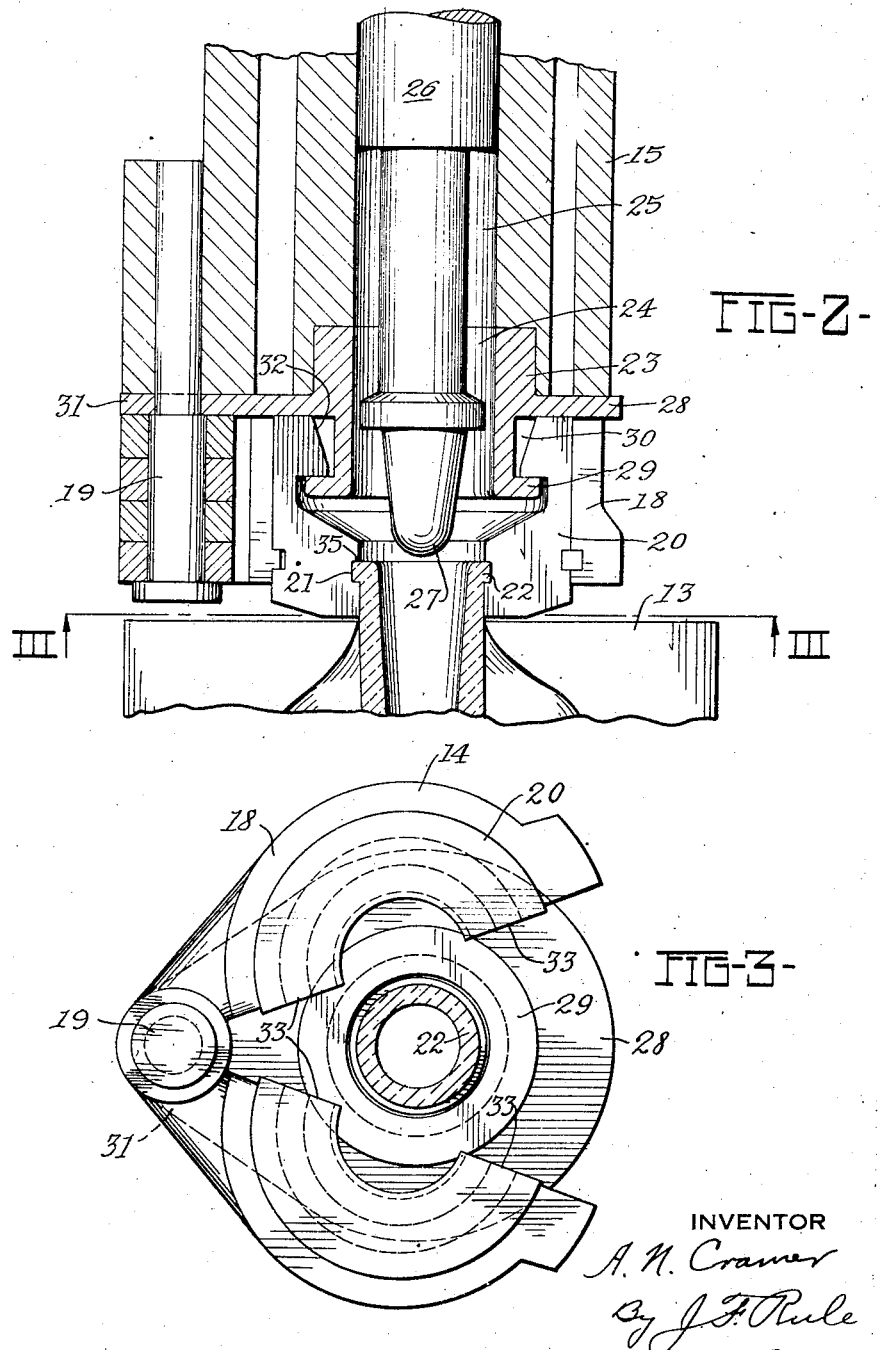

1,578,400

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

MACHINE FOR BLOWING GLASS ARTICLES.

Application filed November 21, 1923. Serial No. 676,135.

*To all whom it may concern:*

Be it known that I, ALBERT N. CRAMER, a citizen of the United States, residing at Toledo, in the county of Lucas and State of Ohio, have invented new and useful Improvements in Machines for Blowing Glass Articles, of which the following is a specification.

My invention relates to glass blowing machines and particularly to the molds and parts cooperating directly therewith.

The invention is shown in connection with a machine of the type in which the charge of glass for forming an article is received in a blank mold and a neck mold in register therewith in which the neck of the article is formed. After the formation of the neck end of the article, the blank mold is opened, leaving the article supported in the neck mold which is then operated to transfer the blank to the finishing mold in which the glass is blown to its finished form. Air for blowing the glass to hollow form in the molds is supplied through the neck mold. The neck mold comprises arms or sections separable for opening and closing the mold, which sections carry thimble sections in which the mold cavity is formed. An "adapter" in the form of a sleeve or tubular member is also employed for positioning and aligning the neck mold arms and thimble.

Heretofore, considerable difficulty has been experienced in maintaining sufficiently tight joints between the sections of the neck mold and thimble and between said parts and the adapter to prevent excessive leakage of the air supplied through the adapter to the neck mold for blowing the glass. Unless the parts are accurately machined and fitted to make practically air tight joints, the leakage of air is excessive and the pressure thereby reduced to such an extent as to interfere with the proper blowing of the glass.

An object of the present invention is to provide suitable means for preventing such leakage or reducing it to a negligible amount, so that a full line pressure may be maintained at the blowing point and waste of air under pressure avoided. In the present invention, leakage of air is prevented or reduced to a negligible amount through a novel construction and arrangement of parts, by which the number of joints which must be maintained tight is reduced, and, further, by the provision of means to insure a practically perfect seal between adjoining surfaces.

A further feature of the invention comprises the provision of means to insure accurate alignment of the thimble sections and thus avoid the defect in the finished ware produced when one mold section is offset with respect to the other.

A further object of the invention is to provide means to prevent the corners of the thimble sections from dragging on the neck of the bottle as said sections open. This dragging causes rapid wear of the mold, which produces defects in the finished ware, and necessitates the frequent replacement of the mold thimbles by new parts.

Other objects of the invention will appear hereinafter.

In the accompanying drawings:

Figure 1 is a part sectional elevation, largely diagrammatic, of a glass blowing machine to which the present invention is applied.

Figure 2 is a sectional elevation on a larger scale of the neck mold and adjoining parts.

Figure 3 is a section at the plane of the line III—III on Figure 2, showing the neck mold in open position.

The machine comprises a center column 10 around which a mold carriage 11 rotates. The mold carriage comprises a number of heads or units, each of which carries a blank mold 12, a finishing mold 13 and a neck mold 14. The neck mold is carried by a head 15 which is rotaable about a horizontal axis by means of gears 16, 17 to swing the neck mold from a position in register with the blank mold, downward to the position shown in Figures 1 and 2, in which the neck mold registers with the finishing mold. The neck mold comprises arms 18 mounted on a pivot pin 19 carried on the blow head 15. The arms 18 carry the sectional thimble 20 comprising two halves which fit together when the neck mold is closed and are formed with the mold cavity 21 in which the neck 22 of the bottle or other blown article is formed.

An adapter 23 is mounted in the lower end of the blow head 15 and provides a means for centering the thimble 20 when the neck mold closes, supports the thimble sections while the neck mold is opening and provides with the thimble a close joint to prevent leakage of air, as more fully pointed out hereinafter. The adapter is in the form of a sleeve or tubular member having a central opening 24 forming a continuation of the cylindrical bore 25 of the blow head, in which a plunger 26 reciprocates. When the plunger is projected, the plunger tip 27 forms with the thimble 20 a neck mold cavity in which the neck 22 is formed.

The adapter 23 includes flange portions 28 and 29 which form the upper and lower walls of an annular groove or channel 30. The flange 28 has an extension 31 provided with an opening to receive the pivot pin 19 by which the adapter is held in place on the blow head. The two halves of the thimble 20 are provided with tongues 32 which enter the groove 30 and form a practically air tight fit or seal between the adapter and thimble. The upper and lower faces of the tongues 32, as well as the faces of the flanges 28 and 29, are machined to provide an accurate and close fit of said tongues between the flanges. The vertical meeting faces 33 (Fig. 3) of the thimble sections are held together by the mold arms 18 to form a seal when the neck mold is closed.

After a charge of glass has been dropped into the blank mold 12 (Fig. 1) and the neck 22 formed in the usual manner, the plunger is withdrawn and air under pressure supplied through the channel 25, 24 for blowing the blank. The initial blowing may take place before the blow head 15 is inverted, and the final blowing after the parts have been brought to the Figure 2 position. During this blowing, leakage of air from the neck mold can only take place between the meeting faces of the thimble sections 20 or through the groove 30. As the thimble sections are held in accurate alignment by the tongue and groove 32, 30 and held together by the neck mold arms, the leakage between said faces is practically eliminated. Escape of air through the grooves 30 is also prevented or is so slight as to be practically negligible, owing to the fact that the tongues 32 are positively held in the groove 30 with no possibility of the meeting surfaces separating to allow the escape of air. The full line pressure of air is, therefore, readily maintained within the neck mold during the blowing of the glass.

The tongue and groove connection between the adapter and thimble sections further serves to prevent either one of said sections from sagging with respect to the other. This prevents any offset or irregularity in the upper surface or lip 35 of the finished article at the point where the thimble sections meet, and thus avoids a very common defect heretofore experienced on account of one thimble section sagging below the other.

The tongue and groove connection between the adapter and thimble sections also serves to hold said sections from sagging and rubbing on the upper surface of the bottle as the neck molds open, because said tongue and groove connection is maintained until the neck mold sections are separated sufficiently to clear the bottle. When the thimble sections are permitted to bear against the edge of the bottle during their opening movement, they are worn rapidly owing to the abrasive action of the glass. The result of this wear appears as a defect in the finished ware.

Modifications may be resorted to within the spirit and scope of my invention.

What I claim is:

1. The combination of a mold comprising arms hinged to swing about a common axis and a thimble comprising separable sections carried respectively by said arms, an adapter arranged to be surrounded by the thimble when the mold is closed, said adapter having a supporting surface in a plane perpendicular to said axis, said thimble sections being formed to engage said supporting surface and thereby support the thimble sections during their opening and closing movements.

2. The combination of a mold comprising arms hinged to swing about a common axis and a thimble comprising separable sections carried respectively by said arms, and means to support said thimble sections and prevent them from sagging during their opening and closing movements, said means comprising an adapter arranged to be surrounded by the thimble when the mold is closed, the adapter being formed with an annular groove on its exterior surface and the thimble sections having tongues to enter said groove, said tongues being formed to fit both the upper and lower surfaces of said groove and thereby provide a substantially air tight double seal between the adapter and mold.

3. In a machine for blowing glass articles, the combination of a blowing head, a neck mold comprising arms carried by said head and hinged to swing about a common axis, said mold including a thimble comprising sections carried by said arms, said sections being formed with a neck mold cavity, an adapter carried by said head and comprising a cylindrical portion projecting into the thimble, said adapter and thimble having a tongue and groove connection by which a substantially air tight seal is formed between the mold and adapter and by which the thimble is supported during the opening and closing movements of the mold.

Signed at Toledo, in the county of Lucas and State of Ohio, this 17th day of November, 1923.

ALBERT N. CRAMER.